April 6, 1943.　　　Z. D. RUBEN　　　2,316,107
ENGINE
Filed Sept. 2, 1941　　　2 Sheets-Sheet 1
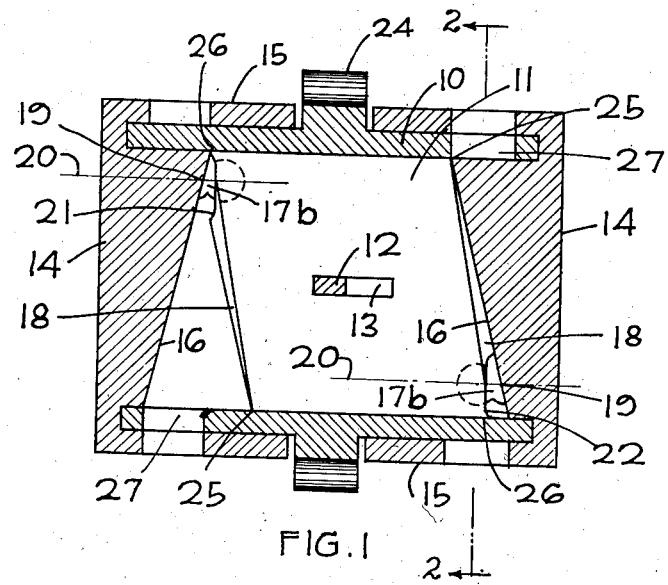
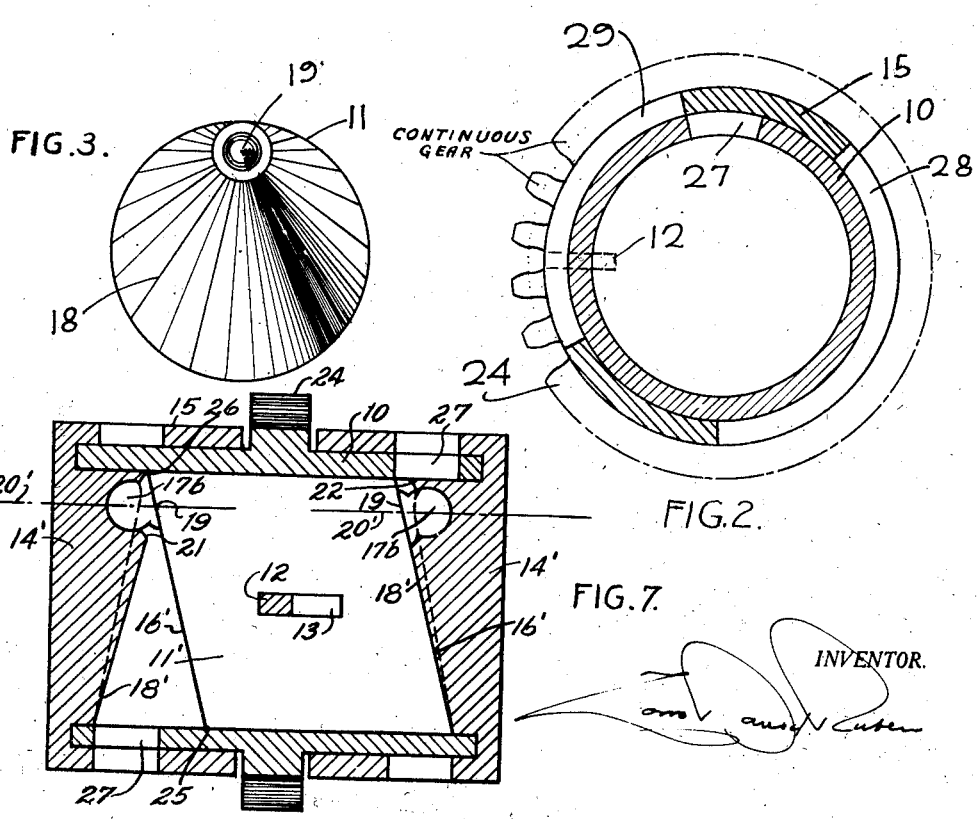
INVENTOR.

April 6, 1943. Z. D. RUBEN 2,316,107
ENGINE
Filed Sept. 2, 1941 2 Sheets-Sheet 2
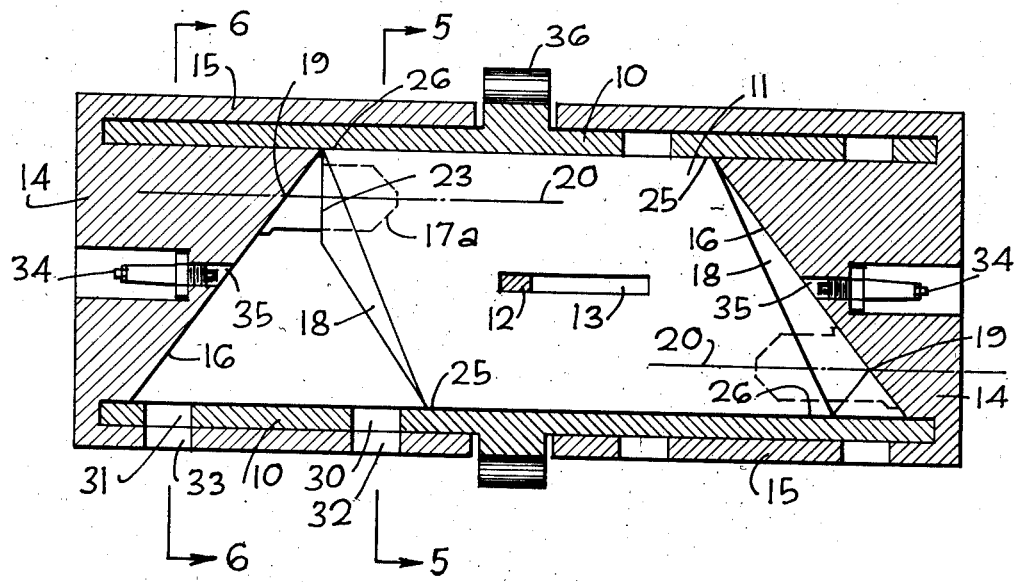
FIG.4
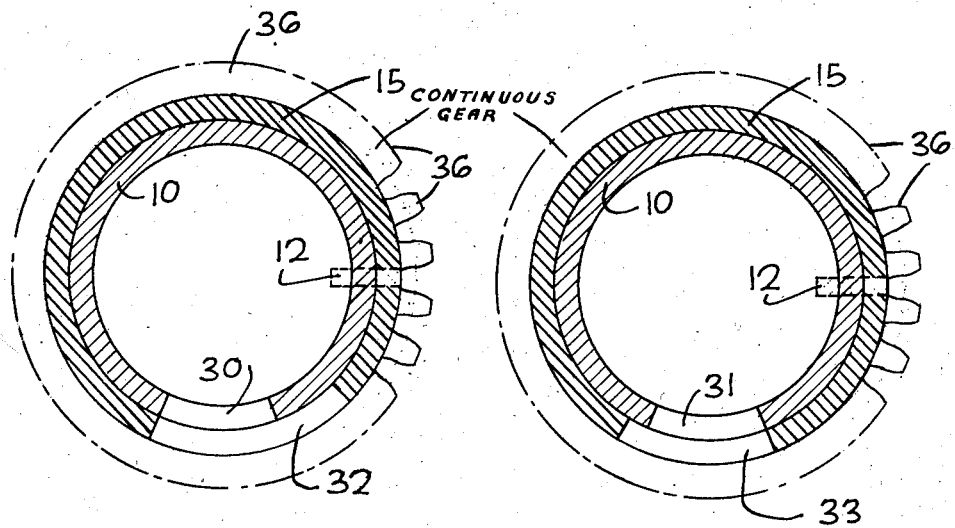
FIG.5
FIG.6
INVENTOR.

Patented Apr. 6, 1943

2,316,107

UNITED STATES PATENT OFFICE 2,316,107

ENGINE

Zorro David Ruben, Chicago, Ill.

Application September 2, 1941, Serial No. 409,330

12 Claims. (Cl. 121—119)

My invention relates to improvements in engines, compressors, pumps, and similar devices in which the principle of cylindrical cam action is applied to a rotary and reciprocatory piston.

This principle is probably the only means of obtaining direct rotary effort from the expansion of fluid mediums in which the surface area of contact between piston and cylinder walls of conventional crank and connecting-rod assemblies is retained. However, it has not, as yet, been utilized to provide a satisfactory device which could equal, in any capacity, the advantages of crank and connecting-rod engines or compressors.

To provide an improved device of the character described herein, my invention accomplishes the following objectives:

1. Provides a maximum ratio of compression with a given piston thrust-bearing area.
2. Eliminates excessive bending strains on shafts or wobble-plates encountered in earlier attempts.
3. Reduces space requirements for double acting engines.
4. Eliminates alternations of piston side-thrust.
5. Eliminates combined, rotation and reciprocation between piston and cylinder walls, leaving only reciprocation between the piston and cylinder, and rotation between the cylinder and bearing.
6. Provides rotary valves without additional moving parts.
7. Eliminates reciprocating parts other than the piston.

Devices proposed heretofore have not provided for proper bearings to sustain the thrust of fluid pressures against the piston face. Universally mounted bearings having slidable surface contact with the piston have been suggested. However, no method has been advanced to allow the piston to approach close to the face of the head when this type of bearing is employed with a double acting piston. Certain minimum relative clearance volumes must be provided for compressors, steam engines, Diesel cycle, and other internal combustion engines; also certain minimum piston thrust-bearing surface commensurate with the maximum pressures encountered.

In my invention, I form the faces of the piston or head in the shape of parts of circular cones, and place rotating or universally mounted bearings in the vertices thereof. The larger the bearing surface required, the closer must the vertex of the cone approach the center of the cylinder. Geometric principles indicate that this method allows the edges of the piston and head to clear each other during the rotary and reciprocatory cycle and yet leave a minimum of clearance at top center.

The piston face is so formed and the bearing placed therein to attain objective number four, as explained hereinafter, although the head may also be so formed and the bearing placed therein as illustrated in Figure 7 to attain the same result. If the face of the piston or of the head were not so formed it would be necessary to extend the bearing into the chamber to permit the edges of the piston to clear the edges of the head as the former rotates. This would reduce the maximum possible compression ratio below the requirements of efficiency for engines and compressors.

With pistons or heads formed as described herein, compression ratios with bearings of varying proportions range from as low as 5 to 1 with bearings of one-half the bore diameter, to as high as 38 to 1 with bearings of one-eighth the bore diameter. These ratios are based on the following formula:

$$\frac{6BC}{(B-C)(2B-C)}+1$$

wherein B is the diameter of the cylinder bore, and C is the distance between the axes of rotation of the bearings. This formula does not take into account the effect of the displacement of the bearing itself, which would increase the calculated ratio. However, this might be offset by valve port and spark plug well clearances. It is evident that the closer the bearings are placed to the center of the piston, the lower is the maximum compression ratio.

Any attempt to devise a successful machine on the cylindrical cam principle must provide a solution for the inherent stress conditions wherein the piston thrust reaction occurs along the periphery of the piston. Devices have also been proposed which suffered inherent stress conditions from excessive bending moments on shafts and wobble-plates. It can be observed in the illustrations of my invention that side-thrust is transmitted to the piston which is resisted by the rotating cylinder wall, a tube of relatively large diameter compared to a shaft and well able to resist pressure and bending moment and transmit it, in the form of low bearing loads, to the sleeve bearings (Objective No. 2).

The reaction of the piston against the cylinder walls depends on the location of the piston thrust bearings. When located in vertices of the piston, as illustrated in Figure 1, they engage guide surfaces on the heads. Since the bearing faces have constant sliding contact with the heads the reaction, neglecting friction, is at all times perpendicular to the guide surfaces. The resulting forces urge the rotating piston and cylinder wall in a direction towards the part of the engine where the cylinder heads are the maximum distance apart. When the bearings are fixed in vertices in the cylinder heads and engage guide surfaces on the piston, as illustrated in Figure 7, the rotation of the bearing face in contact with the piston causes reactions of the piston against the cylinder wall with maximum pressure forces near the "toes" and directed radially outward. There are no reversals of stresses which could cause the piston to shift from one side of the cylinder to the other with the customary "slap" of conventional crank and connecting rod devices.

With the objects mentioned herein and other objects in view which will become apparent, my invention comprises the means described in the following specification, particularly pointed out in the claims forming a part thereof and illustrated in the accompanying drawings, in which, more or less diagrammatically, I show three devices constructed in accordance with my invention. Figure 1 illustrates a compressor being a longitudinal section of the cylinder and heads showing the exposed piston. Figure 2 is a section taken at the port in the right cylinder. Figure 3 illustrates an end view, line shaded, of the piston with the bearing removed. Figures 4, 5, and 6 are similar sectional views of an internal combustion engine operating on the two-stroke cycle, employing fuel injection, spark ignition, and power scavenging. Figure 7 is a view corresponding to Figure 1 and illustrating a modified construction.

Piston rotation is clockwise viewed from right ends of both machines. Referring to the drawings, 10 designates a rotating cylindrical sleeve or cylinder wall enclosing a double-acting piston 11 which is free to reciprocate therein, as it rotates therewith, by means of a key 12, in the rotating sleeve, which operates in the slot 13 in the piston.

Integral with the cylinder heads 14, are sleeve bearings 15, enclosing the mechanism and mounted in axial alinement as shown. Slidably engaged with the inner plane surfaces 16 of the heads or piston are rotating piston thrust-bearings 17a or universally mounted bearings 17b.

The piston faces 18, or the corresponding faces of the head in Figure 7, are formed in the shape of oblique cones with vertices at 19 lying in the axes of rotation 20 of the bearings. The acute angles which the bases of these cones make with a plane perpendicular to the axis of the cylinder are expressed in the formula, $$\tan B = \frac{s}{b}$$

where B is the above mentioned angle, s is the stroke of the piston, and b is the bore of the cylinder. The corresponding angle, A, of the inner face of the head of Figure 1 (or of the piston in Figure 7) is expressed as $$\tan A = \frac{s}{c}$$

where c is the distance between axes 20. The angle between diametrically opposed elements (at 19) equals 180°−2A. The complete conical shape of the piston face is shown for illustrative purposes on the right side of Fig. 3, with the bearing dotted in, in a cut-away view of the piston. In actual practice, insertion of the bearings requires the apex of the cone to be cut away as shown at 21, 22 and 23.

In operation as a compressor, a gear 24 in Fig. 1 is shown as part of the rotating sleeve and is driven by an external power source. The pin or key 12 transmits the rotation to the piston, which reciprocates within the sleeve by virtue of the sliding engagement of the piston thrust bearings against the cylinder heads.

The reaction of the thrust bearings against the piston causes a side thrust against the rotating cylinder wall which keeps pressure off the heels 25 and toward the toes 26, when bearings are located as in Figure 7.

Ports 27 in the cylinder wall, passing over inlet slots 28 and outlet slots 29 in the fixed sleeve bearings allow the compressor to alternately intake and expel air with the following timing:

1. Inlet port opens late to allow re-expansion of clearance air.
2. Inlet port closes late to improve volumetric efficiency.
3. Outlet port opens late after compression to working pressure.
4. Outlet port closes at top center.

In operation as an internal combustion engine, Figure 4, an inlet port 30 and outlet port 31 are provided for each chamber with opposed slots 32 and 33, respectively, in the sleeve bearings. Timing of events in the two-stroke cycle is thus arranged as follows:

1. Explosion of charge before top center by spark plug 34 in well 35.
2. Opening of outlet port before bottom center followed shortly by
3. Opening of inlet port and admission of scavenging air under pressure.
4. Closing of outlet port after bottom center followed immediately by injection through inlet port of fuel which is mixed with air and compressed after closing of inlet port.

The resulting action of the piston is a combined reciprocation and rotation, driving the sleeve 10, by agency of the key 12, and transmitting power for external use by agency of a gear 36. Although, as illustrated, the sleeve or cylinder 10 may be described as a rotary sleeve valve, it should be emphasized that this type of valve arrangement has been selected as a very convenient example. The cylinder heads being stationary, any conventional type of valve may be located in the cylinder head, in lieu of valve ports 27, without in any way altering the functioning of the cylinder 10 as the chamber-enclosing cylinder wall and rotary power transmitter.

In Figure 7 I have illustrated a machine like that of Figure 1. Insofar as the parts of these two machines are the same, the same reference numerals have been used. In the machine of Figure 7 the plane surfaces 16' are formed on the piston 11' instead of on the cylinder heads as in Figure 1, whereas the conical surfaces 18', which correspond to the conical surfaces 18 of Figure 1, are formed on the cylinder heads 14'. The universally mounted bearings 17b—17b are mounted with their axes in alignment, as indicated by the reference numeral 20'.

In connection with the machine of Figure 7 it is to be noted that the formula previously given, $$\tan A = \frac{s}{c}$$

is not applicable because the axes of the two bearings are coincident. The formula $$\tan A = \frac{s}{c}$$

is the same as $$\tan A = \frac{s}{2r}$$

where $r$ is the radial distance of the axis 20 of the bearing from the center of the cylinder, which latter formula is applicable to the construction of the machine of Figure 7 as well as that of Figure 1.

While the drawings show embodiments of the invention, the illustration is by way of example and not by way of limitation. I therefore wish to include all changes, variations, and revisions which fall within the scope of the invention as defined in the appended claims.

I claim:

1. In combination, a rotatable cylinder, stationary cylinder heads at the ends thereof, a cylindrical piston in said cylinder, means for locking the piston to rotate with the cylinder while permitting relative longitudinal movement, and means co-acting with the piston and the cylinder heads for forcing the piston to execute a combined rotary and reciprocatory motion as the piston is moved.

2. In combination, a cylinder, cylinder heads having oblique inner guide surfaces, a rotatable piston within said cylinder and heads, said piston having opposed faces in the form of portions of circular cones, means within said piston comprising bearings, located in the vertices of the circular cones, engaging said guide surfaces in sliding contact, for resisting the thrust of fluid pressures within said cylinder, and causing the piston to execute combined rotary and reciprocatory motion in which said piston may approach said heads with a minimum of clearance volume.

3. In combination, a cylinder, cylinder heads having oblique guide surfaces, a rotatable piston within said cylinder having oblique opposite end faces, means within said piston, comprising bearings at the opposite end faces for engaging said oblique guide surfaces, each of said bearings being at the part of the end face closest to the adjacent guide surface and in slidable contact with said guide surface and exerting a reaction upon said piston, causing a combined rotary and reciprocatory motion thereof, in which said piston may exert a constant side-thrust against the cylinder which is concentrated in radial forces from each bearing and directed outwardly substantially perpendicular to said guide surfaces.

4. An engine comprising a rotatable cylinder, stationary cylinder heads having oblique inner guide surfaces and external cylinder bearings, a double-acting piston having opposed faces in the form of oblique cones, means within the cylinder, comprising a key fixed to the cylinder operating in a longitudinal slot in the piston, and bearings located in the vertices of said cones, slidably engaging said guide surfaces, for producing combined rotary and reciprocatory motion in said piston, means for admitting or exhausting fluid mediums through said cylinder and heads in proper sequence for operation as a heat engine to transmit power by rotary motion of the cylinder.

5. In combination, a rotatable power transmitting cylinder, a double-acting piston within said cylinder having opposed faces in the form of oblique cones, means for locking the piston to rotate with said cylinder while permitting relative longitudinal movement, stationary cylinder heads enclosing the ends of said cylinder and having plane oblique inner guide surfaces in contact with the faces of said piston to allow the piston to execute a combined rotary and reciprocating motion.

6. In combination, a cylinder, a cylinder head at the end thereof, a cylindrical piston in said cylinder, means for locking the piston and the cylinder against rotation with respect to one another while permitting relative longitudinal movement of the two, and means co-acting with the piston and the cylinder head for the forcing a relative combined rotation and reciprocation of the piston and the cylinder head with respect to one another as the piston is moved.

7. In combination, a cylinder, a cylinder head at the end thereof, a piston in said cylinder, means for locking the piston and the cylinder against rotation with respect to one another while permitting relative longitudinal movement of the two, the piston and the cylinder head having opposed faces of which one face is a cone, and the other an inclined plane, said opposed faces being in contact to force a relative combined rotation and reciprocation between the piston and the cylinder head as the piston is moved.

8. In combination, a cylinder, a cylinder head at the end thereof, a piston in said cylinder, means for locking the piston and the cylinder against rotation with respect to one another while permitting relative longitudinal movement of the two, the piston and the cylinder head having opposed faces of which at least one face is a cone, said opposed faces being in contact to force a relative combined rotation and reciprocation between the piston and the cylinder head as the piston is moved.

9. In combination, a cylinder, cylinder heads at the ends thereof, a double acting piston in said cylinder, means for locking the piston and cylinder to prevent relative rotation while permitting relative longitudinal motion of the two, the piston and cylinder heads having opposing sets of faces of which one face of each set is a cone and the other face of each set an inclined plane, means comprising bearings located in the vertices of said cones engaging said inclined planes in sliding contact and causing a relative combined rotary and reciprocating motion between the piston and cylinder heads as the piston is moved.

10. In combination, a cylinder, a stationary cylinder head at the end thereof, a cylindrical piston in said cylinder, means for locking the piston and cylinder against rotation with respect to one another while permitting relative longitudinal movement of the two, and means coacting with the piston and the cylinder head for forcing a relative combined rotation and reciprocation of the piston and of the cylinder head with respect to one another as the piston is moved with respect to the cylinder head, said last named means comprising cooperating surfaces on the cylinder head and on the piston of which one of the surfaces is an oblique cone and the other surface is a plane oblique inner guide surface.

11. In combination, a rotatable power transmitting cylinder, a double acting piston within said cylinder, means for locking the piston to rotate with said cylinder while permitting relative longitudinal movement, stationary cylinder heads enclosing the ends of said cylinder, said piston and cylinder heads having two sets of opposed faces of which one face of each set is an oblique cone and the other face is a plane oblique inner guide surface, the two surfaces of each set rolling with respect to one another to allow the piston to execute a combined rotary and reciprocating motion.

12. In combination, a cylinder, cylinder heads closing the ends of the cylinder, a rotatable piston within said cylinder and between said heads, said cylinder heads and said piston having opposed cooperating faces of which one of the faces is in the form of a circular cone and the face opposite thereof is an oblique bearing guide surface, bearings located in the vertices of the circular cones and engaging the guide surfaces in sliding contact for resisting the thrust of fluid pressures within said cylinder and causing the piston to execute combined rotary and reciprocatory motion in which said piston may approach said heads with a minimum of clearance volume.

ZORRO DAVID RUBEN.